United States Patent [19]

Levien

[11] Patent Number: 5,155,588
[45] Date of Patent: Oct. 13, 1992

[54] COLOR CORRECTION AND APPARATUS FOR PHOTOGRAPHIC REPRODUCTION

[76] Inventor: Raphael L. Levien, Rte. 1, Box 18, McDowell, Va. 24458

[21] Appl. No.: 476,055

[22] Filed: Feb. 6, 1990

[51] Int. Cl.$^5$ .............................................. H04N 1/46
[52] U.S. Cl. ........................................ 358/80; 358/75; 340/703
[58] Field of Search .......................... 358/32, 75, 80; 340/701, 703; 395/131, 155

[56] References Cited

U.S. PATENT DOCUMENTS

| | | |
|---|---|---|
| 3,214,514 | 10/1965 | Schmid .................... 178/6 |
| 3,541,541 | 11/1970 | Engelbart ................ 340/324 |
| 3,612,753 | 10/1971 | Korman .................. 178/5.2 |
| 3,647,295 | 3/1972 | Dobouney ................ 355/38 |
| 3,835,464 | 9/1974 | Rider ..................... 340/324 |
| 3,893,166 | 7/1975 | Pugsley ................... 358/80 |
| 4,037,249 | 7/1977 | Pugsley ................... 358/76 |
| 4,096,523 | 6/1978 | Belmares-Sarabia et al. ....... 358/80 |
| 4,189,741 | 2/1980 | Klopsch .................. 358/76 |
| 4,317,114 | 2/1982 | Walker ................... 340/721 |
| 4,345,313 | 8/1982 | Knox ..................... 364/515 |
| 4,396,940 | 8/1983 | Tanaka et al. ............ 358/80 |
| 4,402,007 | 8/1983 | Yamada .................. 358/75 |
| 4,402,015 | 8/1983 | Yamada .................. 358/280 |
| 4,414,636 | 11/1983 | Ueda et al. .............. 364/526 |
| 4,524,421 | 6/1985 | Searby et al. ............ 364/521 |
| 4,598,282 | 7/1986 | Pugsley .................. 340/703 |
| 4,599,610 | 7/1986 | Lacy ..................... 340/721 |
| 4,602,294 | 7/1986 | Yamada .................. 358/280 |
| 4,602,346 | 7/1986 | Kawakami et al. .......... 364/518 |
| 4,686,669 | 8/1987 | Chang .................... 370/54 |
| 4,689,669 | 8/1987 | Hoshino et al. ........... 358/80 |
| 4,751,503 | 6/1988 | Kermisch ................. 340/709 |
| 4,760,386 | 7/1988 | Heath et al. ............. 340/709 |
| 4,769,696 | 9/1988 | Utsuda et al. ............ 358/80 |
| 4,794,382 | 12/1988 | Lai et al. ................ 340/703 |
| 4,831,434 | 5/1989 | Fuchsberger .............. 358/80 |
| 4,841,291 | 6/1989 | Swix et al. .............. 340/725 |
| 4,843,574 | 6/1989 | Gerber ................... 364/526 |
| 4,845,551 | 7/1989 | Matsumoto ................ 358/80 |
| 4,864,391 | 9/1989 | Taguchi .................. 358/80 |
| 4,979,031 | 12/1990 | Tsuboi et al. ............ 358/80 |

Primary Examiner—Leo H. Boudreau
Assistant Examiner—David Fox
Attorney, Agent, or Firm—Allan J. Jacobson

[57] ABSTRACT

Tone values of a photographic image are stored in a frame store and retrieved from the frame store to produce a corresponding video display. A mouse or trackball is used to locate a point on display and a gamma correction curve look up table is used to interactively show the effect of color correction. Adjustment can be made via lighter and darker switches on the mouse or trackball. These switches subtract or add a bump function to the gamma correction curve in the selected color density plane. The bump function is displaced by the measured tone value in order to achieve more flexible control over the color correction.

29 Claims, 12 Drawing Sheets

EFFECT OF GAMMA ADJUSTMENT

LEGEND

MT = MAXIMUM TONE VALUE
D = DENSITY
MD = MAXIMUM DENSITY VALUE
$\gamma R$ = RED GAMMA CURVE
$\gamma G$ = GREEN GAMMA CURVE
$\gamma B$ = BLUE GAMMA CURVE
CCM = CURRENT COLOR MODE

TO CALCULATE LIGHTER, DARKER COLORS

```
LC * RED : = RF(X,Y) - RTI(CCM)     ─ 131
DC * RED : = RF(X,Y) + RTI(CCM)
              ↓
LC * GREEN : = GF(X,Y) - GTI(CCM)   ─ 133
DC * GREEN : = GF(X,Y) + GTI(CCM)
              ↓
LC * BLUE : = BF(X,Y) - BTI(CCM)    ─ 135
LC * BLUE : = BF(X,Y) + BTI(CCM)
              ↓
            (END)
```

| TRUTH TABLE OF CCM | | | |
|---|---|---|---|
| CCM | RTI(CCM) | GTI(CCM) | BTI(CCM) |
| BLACK | 32 | 32 | 32 |
| CYAN | 32 | 0 | 0 |
| MAGENTA | 0 | 32 | 0 |
| YELLOW | 0 | 0 | 64 |

LEGEND

RTI = RED TONE INCREMENT
GTI = GREEN TONE INCREMENT
BTI = BLUE TONE INCREMENT

COLOR CORRECTION AND APPARATUS FOR PHOTOGRAPHIC REPRODUCTION

BACKGROUND OF THE INVENTION

1. Field of the Art

The invention is a method and apparatus for interactively controlling color correction in photographic reproduction. In particular, the invention relates to determining the optimum settings for gamma correction curves which are then used by a photographic reproducing device.

2. Related Art

One conventional method for color correction when preparing photographs for reproduction employs gamma correction curves. The use of such gamma correction curves was disclosed by Korman in U.S. Pat. No. 3,612,753 issued in 1971. As discussed in column 8 of Korman, an original picture is scanned and for each point scanned signals are developed which are proportional to red, green and blue color densities. Density is defined as the logarithm of reciprocal of the amount of light reflected from a opaque copy or transmitted through a transparency. The three color density signals are converted to their digital equivalents and stored using three parallel channels. Equivalent neutral densities (END) of cyan, magenta, yellow and black inks necessary to reproduce the color in question are then determined. The equivalent neutral densities for cyan, magenta, yellow and black are determined by experiment while the color densities of red, green and blue are calculated. Korman does not disclose controlling or adjusting the stored gamma correction curves themselves.

U.S. Pat. No. 3,893,166 to Pugsley issued in 1975 discloses color correcting image reproducing methods and apparatus. In Pugsley, a computer stores different tone characteristic curves. A control panel permits selecting one of these curves and permitting the end points of the selected curve to be shifted. An analyzing head is directed at selected points on the colored original to generate blue, green and red filter color component signals corresponding to yellow, magenta and cyan printer signals respectively. A-D converter 23 then converts the signals to digital form to facilitate operation of first software stage 24A for tone characteristic selection in computer 24. Tone corrected signals are then subjected to color correction. Basic color correction data is stored in the computer in software stage 24B but can be modified for editorial correction by controls on sub-panel 29D of control panel 29. As discussed in column 6, lines 34-56 of specification, as many as 18 individual controls are needed on sub-panel 29D to modify or perform editorial correction of the basic color correction stored in the computer software stage 24B. Thus, an operator can be overwhelmed with the numerous individual adjustments required.

SUMMARY AND OBJECTS OF THE INVENTION

In view of the above limitations of the related art, it is an object of the present invention to provide a simple and intuitive method of correcting color photographs.

It is a further object of the invention that the method be applicable to all forms of electronic image transmission, reproduction, storage, and retrieval in cases where a color photograph is to be corrected or altered.

It is a further object of the invention to overlay a cursor on a portion of the image displayed on a video monitor.

It is a further object of the invention to measure a tone value in the area of the image defined by the cursor.

It is still another object of the invention to apply gamma curve corrections to the measured tone value and display at the cursor an overlay containing the resulting measured density value.

It is a further object of the invention to provide a mouse or trackball which moves the overlay around a monitor displaying the image.

It is a further object of the invention to provide the mouse or trackball with a plurality of switches used to select a current color plane, and to adjust the density one increment higher or lower.

It is a further object of the invention that the overlay display the current color plane and squares of color each one increment of color density lighter and darker than the density of the current measured tone in the selected color density plane.

It is still another object of the invention to adjust the density by localized adjustments of gamma curves.

It is still a further object of the invention to provide an adjustment of the gamma correction curve over a selectable range thereby allowing a user to select a level of control precision.

It is a further object of the invention to provide adjustment of a gamma curve by combining the gamma curve with an exponential function.

The above objects of the invention and others detailed below are accomplished by generating a cursor and placing it over a portion of a color photograph reproduced from a frame store on a display unit. The tone value at the point of the current cursor position is measured and a gamma correction curve applied to arrive at a density value. The density value is numerically displayed in the overlay. Adjustments are made via switches on a cursor positioning mouse which lighten or darken the image by subtracting or adding a bump function to the gamma correction curves. The bump function is displaced by the measured tone value, which allows flexible control over the color correction. Using the bump function, the overlay display shows squares of color that are respectively lighter and darker than the measured density value. Thus, the operator knows ahead of time the effect of operating the corresponding switches on the mouse which moves the overlay.

BRIEF DESCRIPTION OF THE DRAWINGS

The above invention will be described with particularity in accordance with the following figures.

DESCRIPTION OF THE PREFERRED EMBODIMENTS

Figure 1:
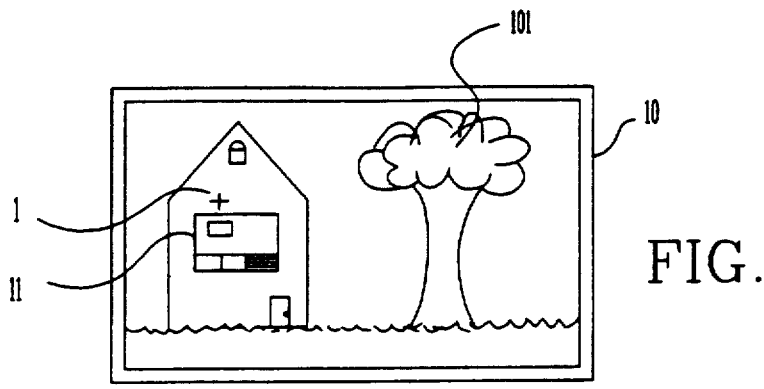
FIG. 1 illustrates a sample display to the operator according to the invention.

FIG. 1 shows video display 10 with photographic reproduction 101. The data for generating photographic reproduction 101 on video display 10 is obtained from frame store 20. Frame store 20 is a memory means in which an original photograph is represented as an array of numbers. Techniques for scanning an original photograph, converting it into an array of numbers and storing the array of numbers in a memory means, such as frame store 20, are well known in the art and are not described herein. FIG. 1 further shows a cursor 1 overlayed on photographic reproduction 101. Adjacent the cursor is rectangle 11. Both cursor 1 and rectangle 11 are generated in cursor/display generator 26 and overlayed on the video photographic reproduction 101 using overlay means 24.

Figure 4:
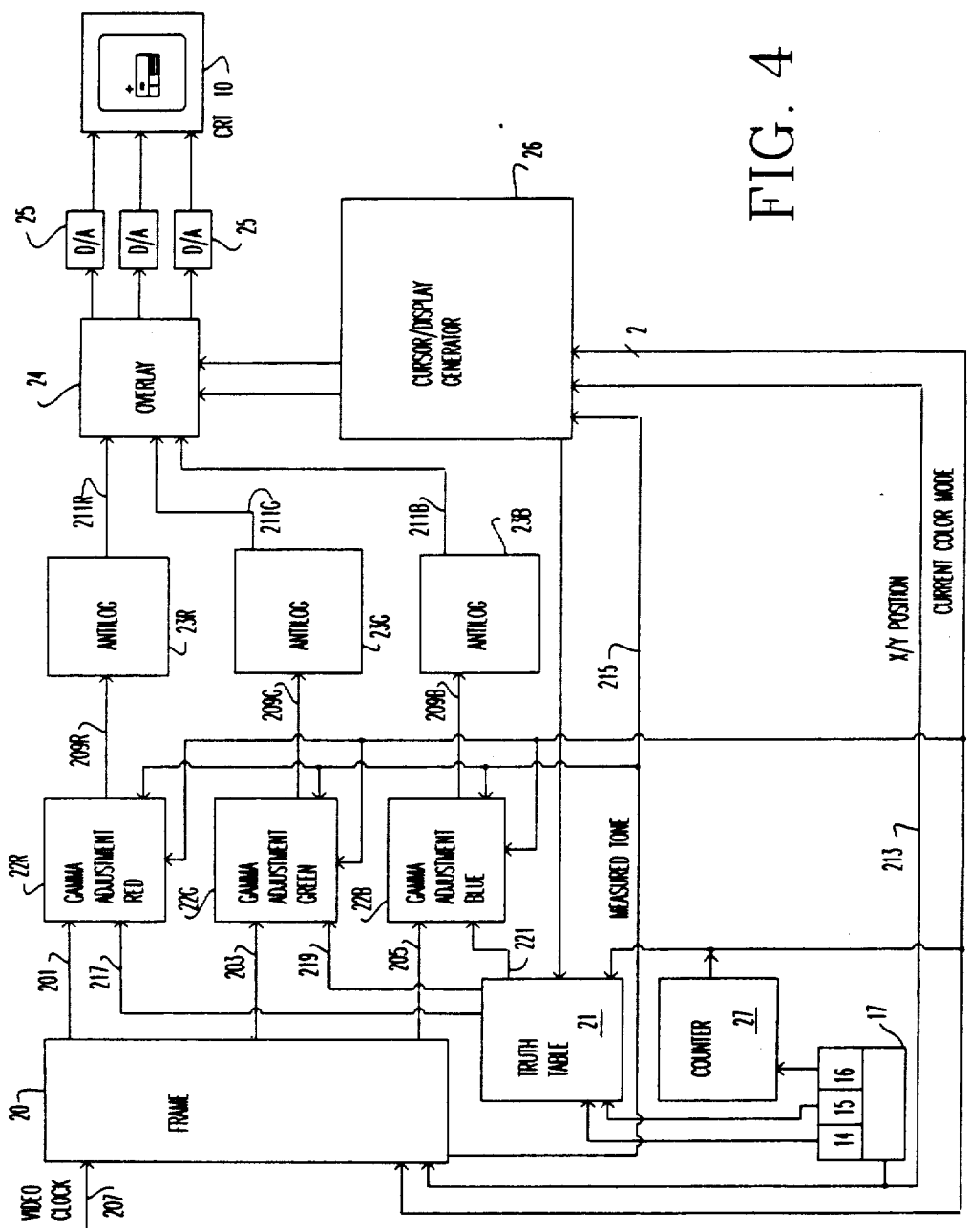
FIG. 4 is a block diagram of one embodiment for performing color control according to the invention.

Frame store 20 which stores the original photo as an array of numbers, separately stores measured tone values received from the scanner for each of three planes, one for red, one for green, and one for blue, as shown in FIG. 4. Thus, frame store 20 provides red, green and blue tone values as 8-bit words on signal lines 201, 203 and 205, respectively. Video clock 207 clocks these values out in a parallel manner to gamma adjustment circuits 22R, 22G, and 22B. For each measured tone value, the gamma adjustment circuits produce red, green and blue density signals along lines 209R, 209G and 209B, respectively. These correspond to the cyan, magenta and yellow color density planes, respectively. It is known that the density represents the negative of the logarithm of the ratio between the light reflected from an image and the light reflected on a white background. Thus, density D is expressed as:

$$D = -\log (L \text{ reflected}/L \text{ white})$$

Each density signal is provided to a corresponding antilog circuit 23R, 23G, 23B. Each antilog circuit produces an adjusted tone value for each of the colors along lines 211R, 211G, 211B. These signals are then passed through overlay circuitry 24 and digital to analog (D/A) converters 25 for display on CRT 10. It should be noted that the circuits as described above and shown in FIG. 4 illustrate separate gamma correction circuits, antilog circuits, and D/A converters for each color plane. However, it would be known to one of ordinary skill in the art that the above circuits could be replaced with a single circuit which is time multiplexed to achieve the same result. In addition, it is also possible to produce the same results using known software techniques. Such alternative circuit designs and software techniques are within the scope of the invention disclosed herein.

Figure 3:
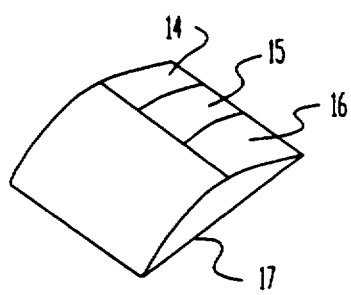
FIG. 3 illustrates a mouse for locating the cursor and overlay on the screen and with switches according to the invention mounted thereon.

While clocking data from frame store 20 with video clock 207 allows reproduction of the stored image on CRT 10, another output based on cursor position is also produced from the frame store. Mouse or trackball 17, shown in FIGS. 3 and 4, is used to position a cursor generated by cursor/display generator 26. X and Y position data are produced by the mouse or trackball and transmitted to the frame store 20 and cursor/display generator 26 on signal line 213. This allows cursor display generator 26 to generate and position the crosshairs of the cursor 1 at the appropriate position commanded by mouse 17. It also allows frame store 20 to recall from memory color characteristics at the position specified by the intersection of the lines of the crosshair. Switch 16 of mouse 17 has an output connected to counter 27 for stepping the counter through its states to select the desired color plane. The output of counter 27, which in this example can be a simple two stage counter, identifies the current color density plane selected by the operator. Different counts correspond to different color plane selections as shown in the following table:

01 cyan
10 magenta
11 yellow
00 black

It should be noted that in the black mode (counter 27 set at 00) the frame store reports a weighted average of the red, green and blue color planes as the measured tone on signal line 215. When the cyan color plane is selected, frame store 20 reports the measured red tone at the point corresponding to the crosshairs as the measured tone on signal line 215. Similarly, when the counter selects magenta and yellow, the frame store 20 reports the contents of the measured green and blue color planes respectively at the point of the intersections of the lines of crosshair 1 on signal line 215.

The measured tone on signal line 215 is routed to cursor/display generator 26. Cursor/display generator 26 generates the display shown in FIG. 2. The display consists of cursor 1 and display box 11. Display box 11, which is in the form of a small rectangular display, is divided into several display areas. Display area 6 shows four solid color stripes, each stripe corresponding to one of the cyan, magenta, yellow and black color density planes. Display area 3 is a solid color which indicates the current color density plane selected for measurement. Thus, display area 3 shows the one of these four possibilities selected by the operator using switch 16 to increment counter 27. Display area 4 displays a color with one increment less density in the selected color density plane shown in area 3 than the measured tone and display area 5 displays a color with one increment more density in the selected color density plane than the measured tone. Finally, display area 2 of small display rectangle 11 is a numerical display of the density calculated of the gamma adjusted measured tone reported on signal line 215. The cursor display generator 26 provides display information to overlay circuit 24 which overlays the cursor and rectangular box 11 on the video display. Production of the overlay is further discussed below.

As previously mentioned, mouse 17 has switches 14 and 15. An operator moves mouse 17 so that the crosshairs of the cursor identify at least one point on a displayed portion of the image. As previously described, the image is stored in frame store 20 as numerical representations of tone values in the three color planes. The operator selects a color density plane using switch 16 and the selected color density plane is identified by the display in area 3 of small rectangle 11. Since the point identified by the crosshairs has a measured tone value, the crosshairs identify a point on the gamma correction curve having a color density corresponding to a tone value in the selected color density plane. Switch 14 is activated to adjust the color density of this tone value of the gamma correction curve in the selected plane to be a color with one increment less density than the measured tone. This corresponds to selecting the tone represented in display area 4. Similarly, switch 15 is activated to replace the density of the tone value on the gamma correction curve specified by the intersection of the crosshairs with a density corresponding to the tone displayed in display area 5. Display area 5 shows a color with one increment more density than the measured tone. Since the lighter and darker tones are displayed in the overlay rectangle 11, an operator can observe the effect of selecting the lighter or darker tones in advance. It should be noted that the adjustment is to the density corresponding to the tone value on the gamma correction curve. All other points with the same tone value as the point specified by the intersection of the crosshairs of the cursor will be adjusted the same way. For example, if all the points on the wall of house displayed in FIG. 1 have the same tone value, adjusting the gamma correction curve at the one point specified by the intersection of the crosshairs of cursor 1 will affect all the points in the display of the entire wall of the house in the same way. In addition, points with similar but not identical tone values will also be affected, although to a lesser degree.

Figure 6:
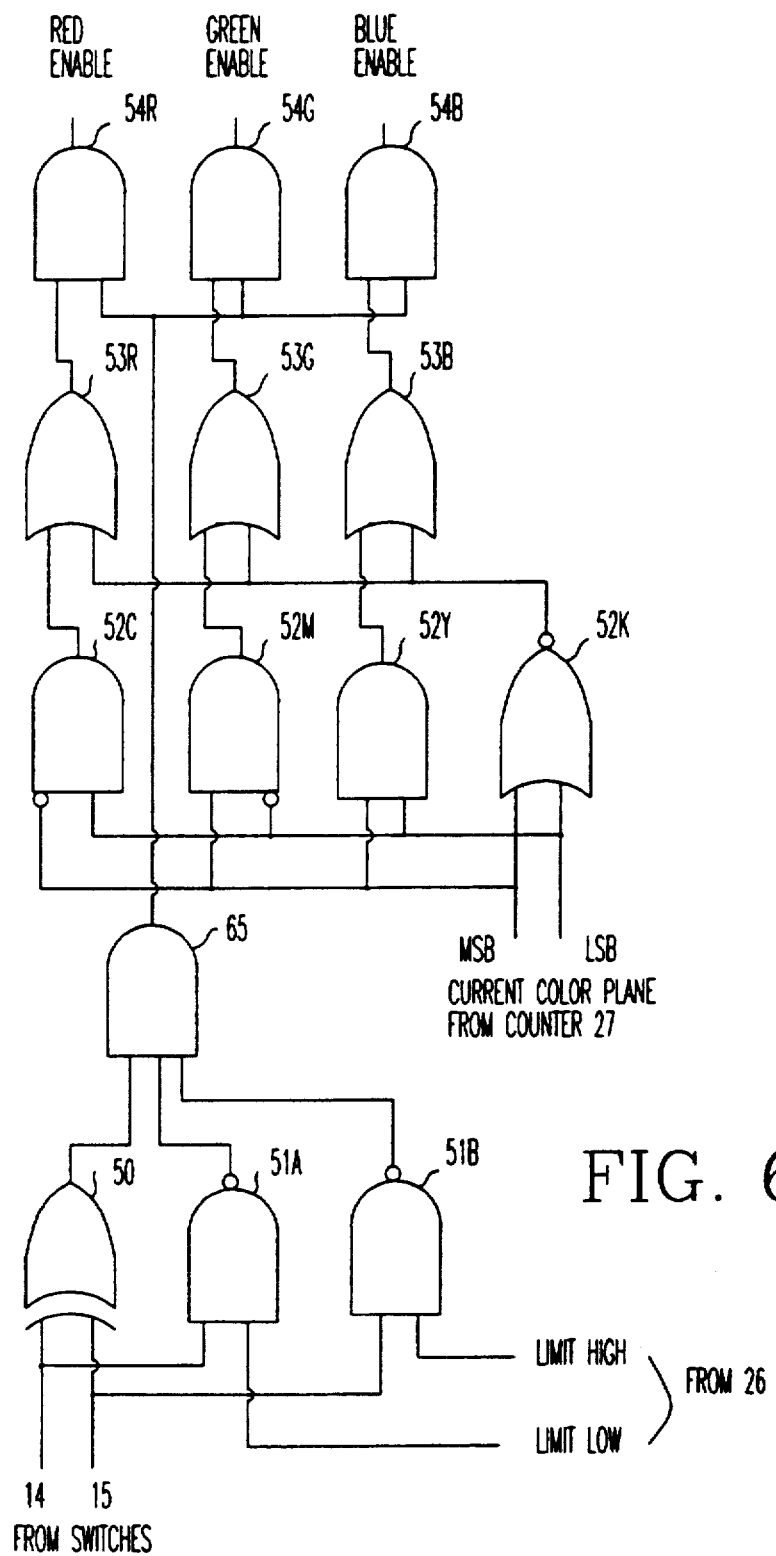
FIG. 6 shows a truth table which can be used to selectively enable the adjustment functions of the three individual gamma adjustment circuits.

The above tone adjustment is accomplished by routing signals from the mouse to truth table circuit 21. The logic in truth table 21 is illustrated in FIG. 6. The 2-bit output from counter 27 which indicates the current color plane is routed to logic gates 52K, 52C, 52M and 52Y which correspond to the black, cyan, magenta and yellow color planes. These gates act as a 1 out of 4 decoder which is arranged so that the one output corresponding to the selected color plane is logically high at any given time. The outputs of gates 52 drive OR-gates 53R, 53G and 53B. The circuit arrangement drives the output of each of the OR-gates high when the corresponding cyan, magenta or yellow plane is selected. In addition, the output of all of the OR-gates 53R, 53G and 53B go to a logical high state when the black color plane is selected. It should be noted that the source of the logic can be reversed or other equivalent logic circuit or other signal or data processing arrangements could be employed to accomplish this function.

As shown in FIG. 4, cursor/display generator 26 also generates limit high and limit low signals. These are used by gates 51A and 51B as shown in FIG. 6. The limit low signal indicates that the effect of switch 14 is to be disabled. Similarly, the limit high signal disables the effect of switch 15. Switches 14 and 15 drive exclusive-OR-gate 50 so that the output of gate 50 is high when either one, but not both, of switch 14 and 15 is pressed. The signal from switch 14 and 15 is also routed to NAND gates 51A and 51B, so that, in the absence of the limit high and limit low signals, the outputs of these gates become a logical high. In this case, the output of AND gate 55 assumes the status of the output of exclusive OR-gate 50. On the other hand, if switch 14 is pressed and the limit low signal is high, the output of gate 51A becomes low. This drives the output of gate 55 low. Similarly, if switch 15 is depressed with the limit high signal present, the output of gate 51B becomes low, also driving the output of gate 55 low. The output of gate 55 must be at a high in order to generate the red enable, green enable and blue enable signals produced by AND gates 54R, 54G and 54B. These signals correspond to the red, green and blue enable signals 217, 219 and 221, respectively, which are routed from truth table circuit 21 to enable gamma adjustment circuits 22R, 22G and 22Y.

Figure 5:
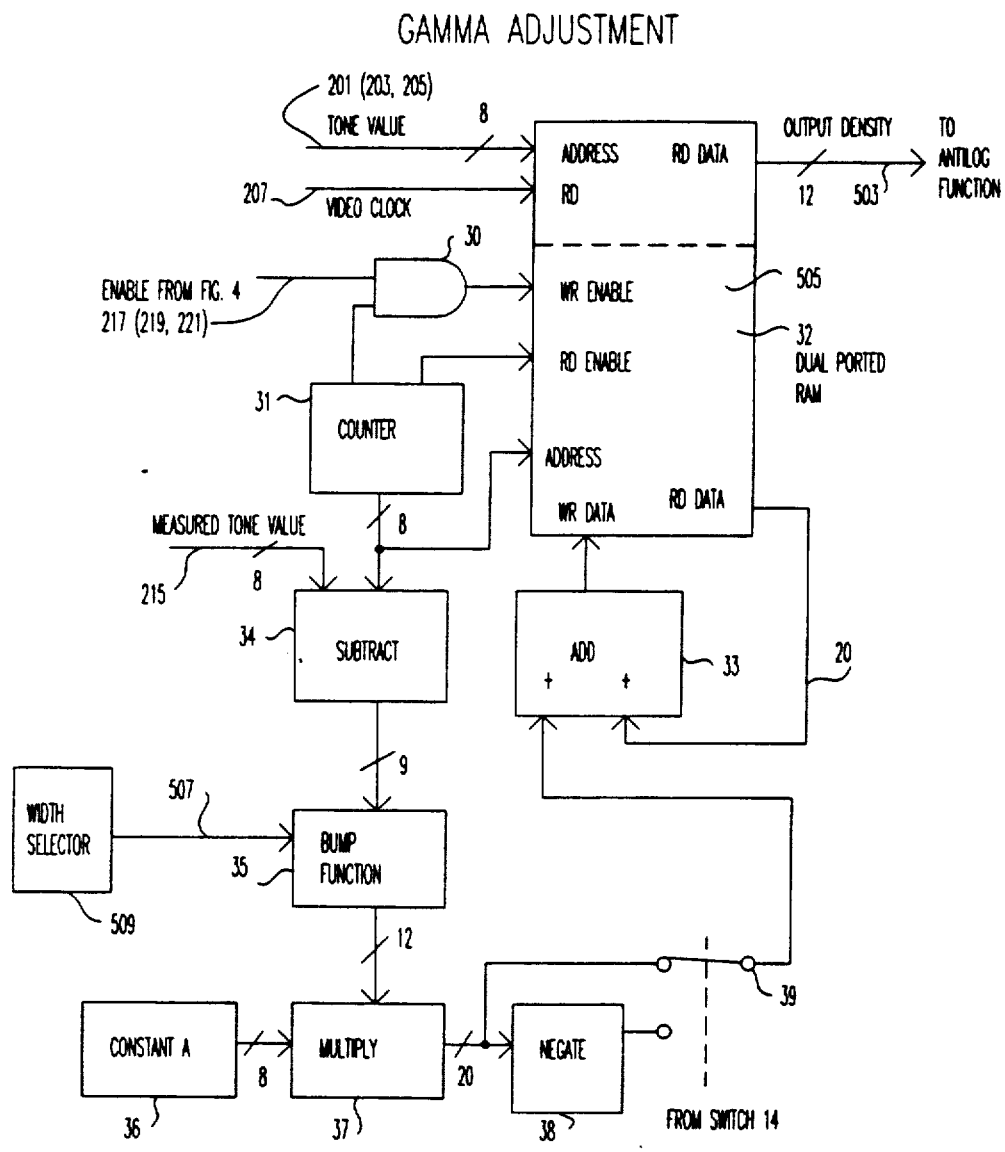
FIG. 5 is a block diagram of one embodiment of a gamma adjustment circuit.

The operation of the gamma adjustment circuits depends on the enable signal from the truth table and the measured tone at cross-hair 1. FIG. 5 shows a more detailed view of the gamma adjustment circuit according to the invention. It should be noted that gamma adjustment can be performed at any convenient time during the video display. One convenient time is during a vertical blanking interval. It should further be noted that the implementation of the gamma adjustment circuit as a multi-ported random access memory is only one of several embodiments possible. It would be within the scope of the invention to perform the gamma adjustment in equivalent circuitry known to those of ordinary skill in the art or to perform gamma adjustment in software.

FIG. 5 shows a multi-ported random access memory such as dual-ported RAM 32. One port 501 of the RAM receives an 8-bit address such as red tone 201, green tone 203, or blue tone 205 from frame store 20. Video clock 207 causes the memory to read the gamma correction curve data and output a 12-bit signal on output density line 503. Output density line 503 could be one of cyan density signal line 209C or, magenta density signal line 209G, or yellow signal density line 209B. The adjustment is accomplished by reading the appropriate gamma correction curve data from the dual ported RAM which is stored, for example, as a look-up table. It should be noted that RAM 32 is initialized with predetermined gamma correction curves and has a means for reading out adjusted values of the gamma correction curves when the operator is satisfied with the adjustments. Thus, the top-half 501 of the dual-ported RAM 32 converts tone data from frame store 20 into density data which is then used by antilog function generators 23.

The lower half 505 of dual-ported RAM 32 in FIG. 5 is used for adjustment of the gamma correction curves. One of the enable signals 217, 219 or 221 from the truth table circuit 21 is applied to AND gate 30. Routing a counter output from counter 31 to the AND gate allows the counter to provide the address for data written to dual-ported RAM 32. Counter 31 can be clocked or free running to count through all addresses of the gamma correction curve. In a typical application, 8 binary digits of resolution in the tone value might be used. Therefore, counter 31 would step through each of $2^8$ or 256 addresses. The counter 31 thus has an 8-bit output which is routed to the address input of the lower portion 505 of dual-ported RAM 32. For each address, counter 31 also outputs a signal to the read enable input of the RAM. This causes the gamma correction data to be read out of the RAM to one of the inputs of adder 33.

Typically, this data is 20 bits. It should be noted that the number of bits used is selected to provide eight bits more precision in the gamma correction curve adjustment than the precision of the output used to generate the display. This is to avoid introducing roundoff errors in calculating the adjustment and provide sufficient dynamic range to the display.

Each address generated by the counter is also routed to the positive input of subtractor 34. A second input of the subtractor is driven by the 8-bit measured tone value corresponding to the point identified by the crosshair of cursor 1 from the frame store 20. The difference, x, between each address generated by the counter, c, and the measured tone value, d, is used to drive an input to bump function generator 35. The bump function generator is used to adjust the gamma correction curve used to correct the color in the displayed output. This is essentially achieved by addition or subtraction of the bump function and the original gamma correction curve stored in the memory.

Procedurally, if an operator wishes to remove, for example, magenta from the sky portions of the photographic reproduction on the video display, he uses switch 16 on the mouse 17 to set the color plane to magenta so that only this curve is modified. The tone value of the sky is measured and a numerical value representing the gamma adjusted density of the measured tone in the selected color density plane is displayed in area 2 of the rectangular overlay. The numerical indicator provides the operator an indication of the color density and is useful in some applications. For example, if the densities are the same numerical value in all the color planes, the operator is assured that the displayed color is a neutral gray. In addition, the operator can use the numerical indicator to match specified requirements for certain tones, such as flesh tone requirements imposed by printing entities such as magazines and newspapers.

By hitting the lighter button 14 on the mouse 17, the operator can cause a decrease in the region of the gamma correction curve around the measured tone. The width, w, of the bump function specifies the range of area of the measured tone that should be modified. A narrow width provides a more precise adjustment of the gamma correction curve, but may be more difficult to operate because there is a larger number of points available on the gamma correction curve for adjustment. On the other hand, a wider width of the bump function adjusts a wider region of the gamma correction curve around the measured tone with less precision. Thus, the width, w, of the bump function can be selected to achieve a desired level of precision in view of the number of adjustments desired. The width of the bump function could be either programmed by the operator, for example as shown by signal line 507 connected to width selection means 509 or preset without permitting operator adjustment. Bump function width selection means 509 could be a switch with discrete settings, a potentiometer for continuous settings or some other adjustment means as would be known to those of ordinary skill.

Typical bump function curves can a be piece-wise quadratic or a standard bell curve. A typical piece-wise quadratic curve for the bump function would be as follows:

$$b(x) = 0 \quad \text{if } |x/w| > 1.5$$
$$b(x) = 2/3*(x/w + 1.5)^2 \quad \text{if } -1.5 < x/w < -.5$$
$$b(x) = 1 - 4/3*(x/w)^2 \quad \text{if } -.5 < x/w < .5$$
$$b(x) = 2/3*(x/w - 1.5)^2 \quad \text{if } .5 < x/w < 1.5$$

An alternate bell shaped bump function could be expressed according to the following equation:

$$b(x) = e^{-(x/w)2}$$

In some cases, it might also be useful to define b(x) to equal one. One example of such a case is the correction of overall color balance.

In any case, the output of the bump function generator 35 is typically represented as an unsigned 12 digit fraction which is supplied to multiplier 37. Multiplier 37 multiplies the bump function with a constant "a" to arrive at a 20-bit output signal. Typically "a" is in the order of 0.01 of the density value. This output signal can also be negated as shown in function block 38 of FIG. 5. Switch 39 can switch between both positive and negative versions of the bump function. This choice is made based on the status of switch 14 and 15. If switch 14 is depressed, the negative version of the bump function output from function block 38 is selected. If switch 15 is selected, then the positive version of the bump function can be selected from the output of multiplier 37. Adder 33 adds the current value of the gamma correction curve read from the dual-ported RAM 32 to the selected positive or negative bump function output. This result is then provided to the write data input of the dual-ported RAM 32 which, when the write enable signal is activated, causes data to be written into the dual-ported RAM 32.

As previously mentioned, the write enable signal is generated by AND gate 30 which receives the enable signal from the truth table circuits and pulse from counter 31. When either is low, the write enable signal at the dual-ported RAM is not enabled and the contents of the RAM remain unchanged. When both the output of the counter and the enable signal are at a logical 1, the output of AND gate 30 rises to a logical 1 to activate the write input of the dual-ported RAM causing the RAM to be updated according to the formula:

$$g'(c) = g(c) + a*b(c-d)$$

where g'(c) is the new function for the tone curve, g'(c) is the old function of the gamma correction or tone curve as stored in the dual-ported RAM 32, a is a constant, b(x) is the response of the bump function generator 35, d is the measured tone value from frame store 20, and c is the output of counter 31 and x equals c−d.

Figure 7:
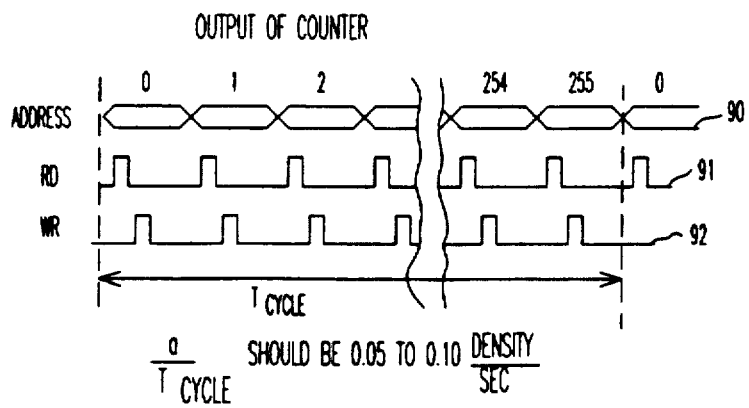
FIG. 7 illustrates the output of a counter shown in FIG. 5.

FIG. 7 illustrates the timing sequence of counter 31. The address line counts from 0 to $2^8-1$ or 255, thus counting 256 values of the tone curve. Within the period of each address of the tone curve, the read line is strobed first so that the data can be read out of dual-ported RAM and routed to adder 33. Subsequently, after an appropriate delay to account for the activities of subtractor 34, bump function generator 35, multiplier 37, negative function 38, switch 39 and adder 33, a second signal from counter 31 is strobed to AND gate 30. If the enable signal is high, the write enable of the dual-ported RAM 32 will allow data to be written into the RAM. One cycle is completed after the entire 256 samples of the correction curve have been evaluated. It should be noted that any number of samples can be used to represent the gamma correction curve. Thus, a 12-bit address could be used to represent $2^{12}$ samples of the gamma correction curve to achieve higher precision.

Figure 8A:
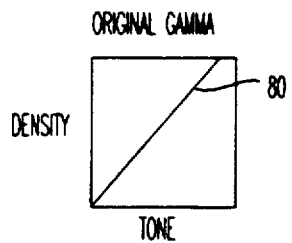
FIGS. 8a-8d show typical gamma curves and bump functions.
Figure 8B:
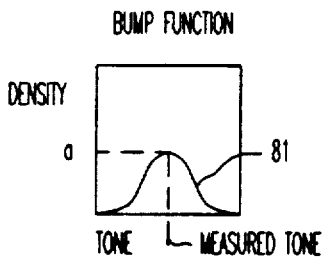

As previously mentioned, the output of bump function generator 35 is multiplied by a constant "a." Constant "a" is used to scale the amplitude of the bump function. The effect of adjustments to the gamma correction curves is illustrated in FIG. 8. FIG. 8A shows a gamma correction curve 80 plotted on an axis of density versus tone as the curve might be originally stored in RAM 32. This would be done as an initialization step before operation. FIG. 8B shows a typical bump curve 81 displaced so that the center of the bump function is at the measured tone and scaled by the constant "a." It should be noted that the constant "a" can be selected so that the ratio between the constant "a" and the cycle time is between 0.05 and 0.10 density units per second.

Figure 8C:
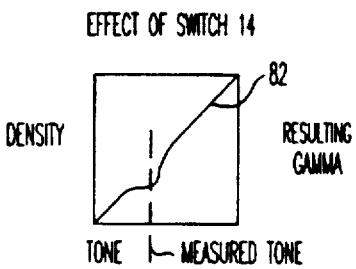
Figure 8D:
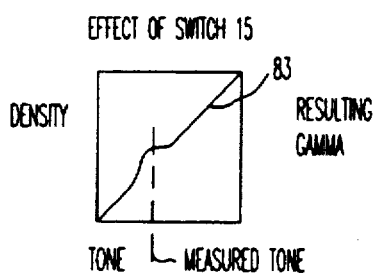

FIG. 8C shows the effect of operating switch 14 to subtract the bump function from the originally stored gamma correction curve. This is accomplished by setting switch 39 to the output from the negation circuit 38 and adding the negative of the bump function to the gamma correction curve read from the dual-ported RAM 32. Curve 82 thus represents the new gamma correction curve which is adjusted based on the measured tone. FIG. 8D on the other hand shows gamma correction curve 83 which is the result of operating switch 15 to add bump function 81 to the originally stored gamma curve 80.

Figure 9:
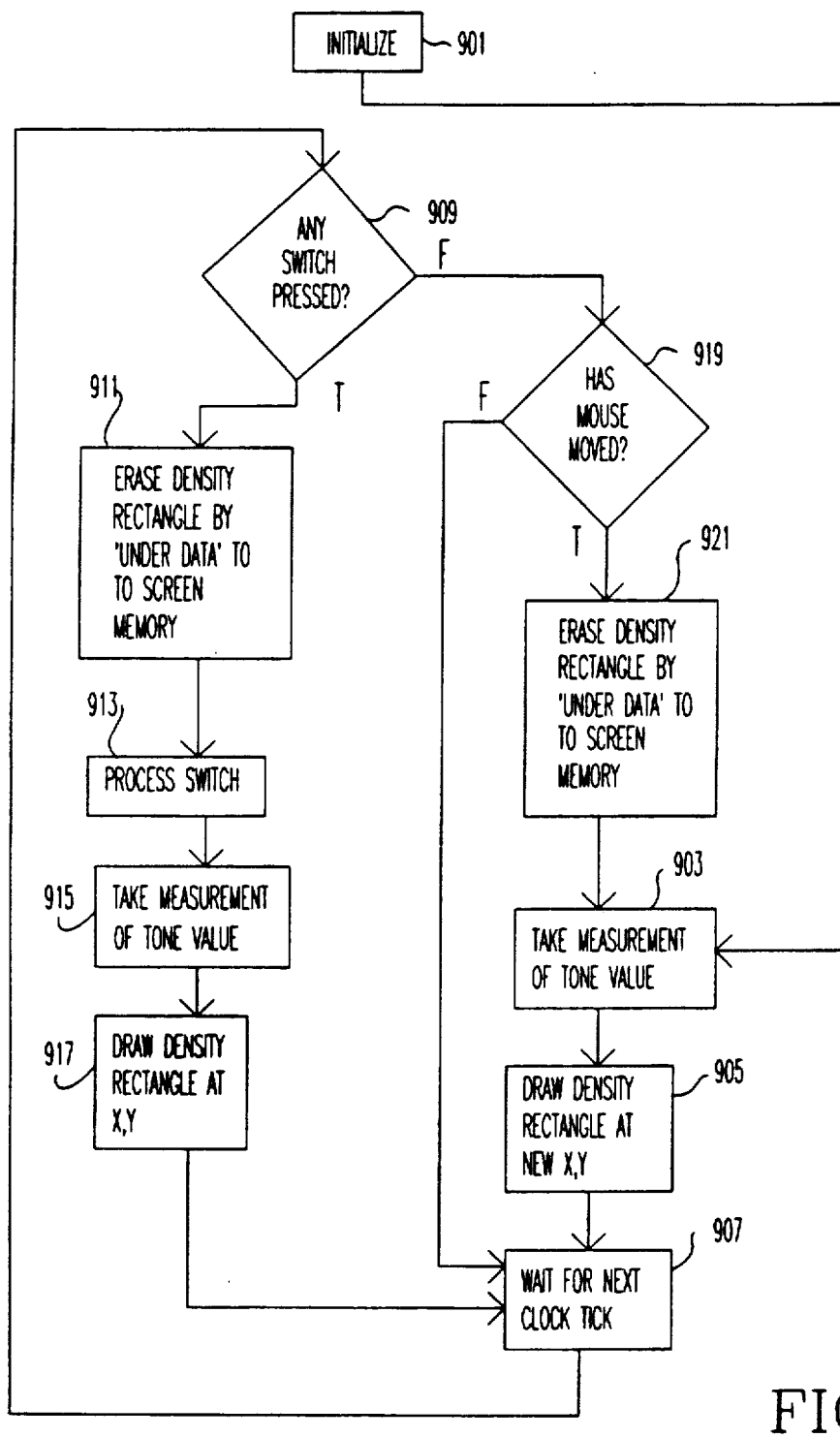
FIG. 9 is a flowchart generally illustrating the method according to the invention.

FIG. 9 is a flowchart which illustrates overall processing of the color correction method according to the invention. Following initialization step 901, a measurement of the tone value is performed as shown in step 903. Next, a density rectangle is drawn at the location specified by the mouse, as shown in step 905. No further processing takes place until the next increment of the clock, as shown in function block 907. Upon receipt of the next clock pulse, mouse 17 is tested to determine if any switch has been pressed, as shown in function block 909. If so, it is necessary to modify the display generated. Function block 911 shows that the density rectangle is erased and the data is written to a screen memory. Function block 913 shows that processing of the status of the switches of the mouse 17 then takes place. As previously discussed, the mouse switches are used to set the current color plane and to select lightening or darkening of the image by one tone increment according to the bump function adjustment of the gamma correction curve. Following the switch processing the tone value is measured, as shown in function block 915. Subsequently, the density is calculated and the rectangle drawn to display the density value, as shown in block 917. No further processing is performed until the next increment of the clock, as shown in function block 907.

Upon this event, control is transferred to function block 909, which determines if a switch on the mouse has been pressed. If no switch has been pressed on the mouse, function block 909 transfers control to function block 919 which determines if the mouse has been moved. If not, no further processing takes place until the next increment of the clock. However, function block 921 shows that if the mouse has been moved the density rectangle is deleted and the data written to screen memory. Subsequently, control is transferred to function block 903 where the measurement of the tone value at the new location specified by the mouse is made.

Figure 10:
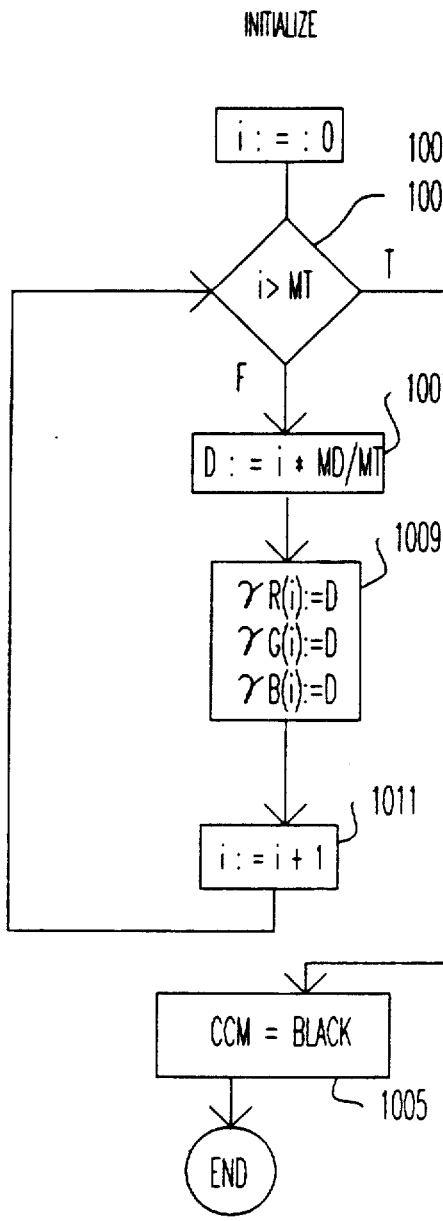
FIG. 10 is a flowchart illustrating the steps in the initialization phase.

FIG. 10 is a more detailed illustration of the initialization function. Initialization begins at step 1001, which sets a variable i to zero. The variable is tested to determine if it is greater than the maximum tone value. If not, the current color mode is set equal to black, as shown in function block 1005. On the other hand, if the variable is greater than the maximum tone value, density is set equal to i times the maximum density divided by the maximum tone value as shown in block 1007. The density of the red, green and blue gamma correction curves are then set equal to the calculated value of density in block 1009. In block 1011, the variable i is incremented and control transfers to block 1003 where the process is repeated until i no longer exceeds the maximum tone value.

Figure 11:
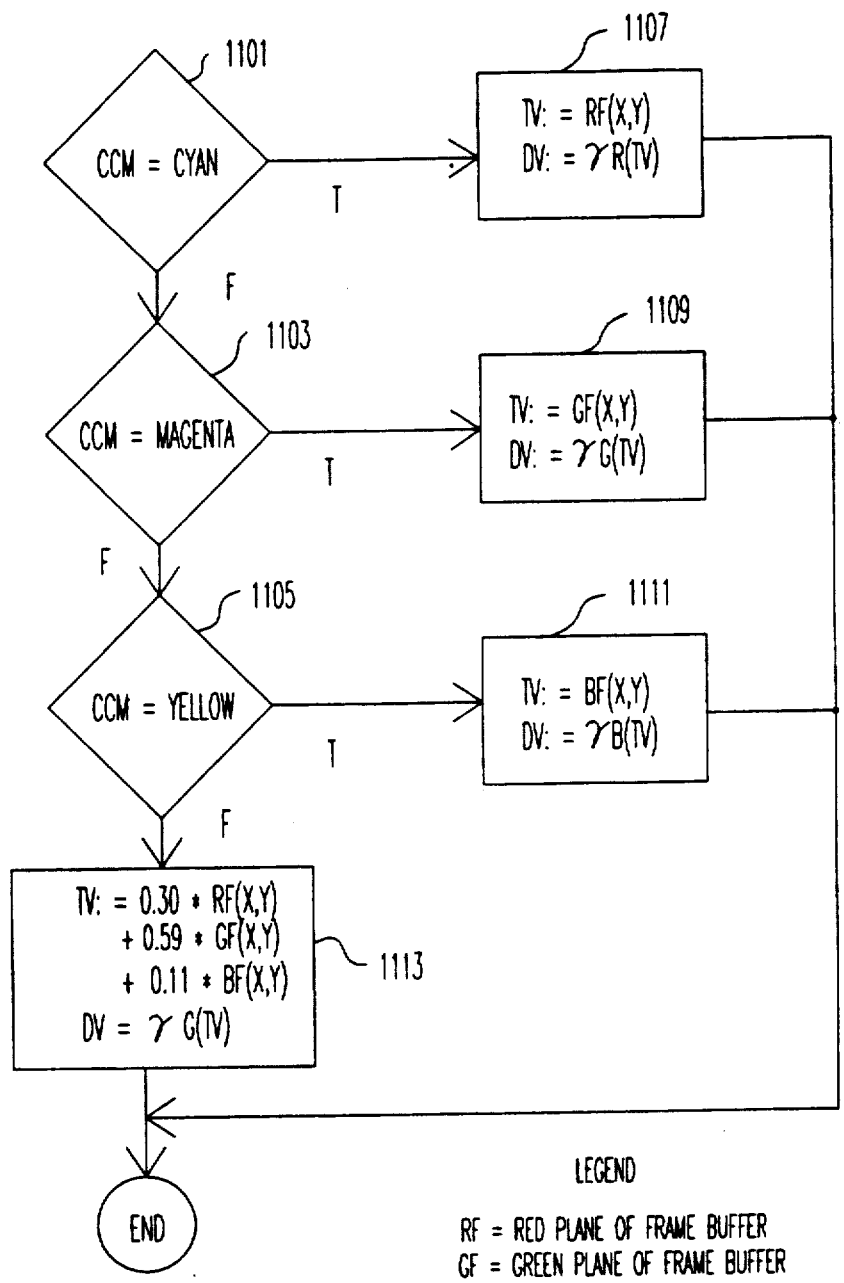
FIG. 11 is a flowchart showing the steps involved in taking the measurement of the tone value.

FIG. 11 is a more detailed illustration of the measurement of the tone value. Function blocks 1101, 1103 and 1105 illustration that each of the cyan, magenta and yellow current color modes are tested to determine if any is selected. As shown in function blocks 1107, 1109 and 1111, the tone value for cyan, magenta and yellow is the tone value of red, green and blue plane frame stores, respectively. Similarly, the density values for cyan, magenta and yellow are obtained by accessing the gamma correction curve of the measured tone value. If neither cyan, magenta or yellow is selected, the current color mode is black. Although any method for selecting the current color mode can be used, in the circuitry previously discussed this corresponds to a 00 count from counter 27. Function block 1113 illustrates the processing which takes place in this case. The tone value is determined by adding fractions of the red, green and blue plane measurements from the frame buffer. Based on this tone value, the measured density is taken from the point on the green gamma correction curve corresponding to the calculated measured tone value. This completes tone value measurement.

Figure 2:
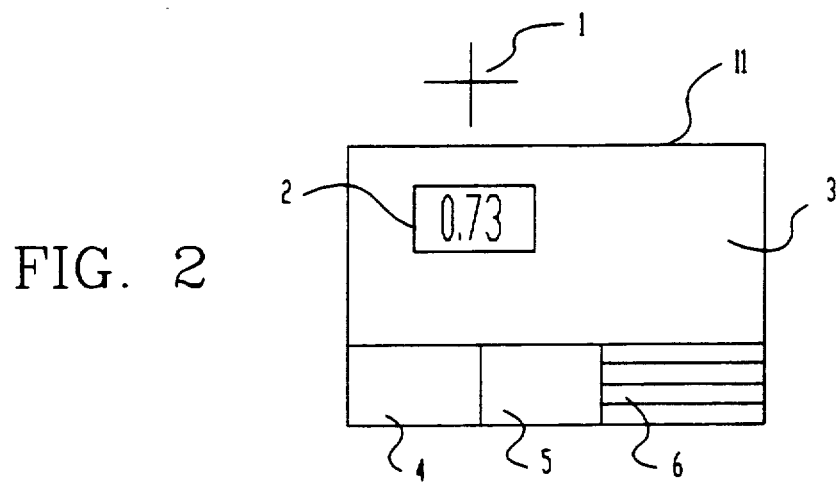
FIG. 2 shows the overlay used on the screen according to the invention.
Figure 12:
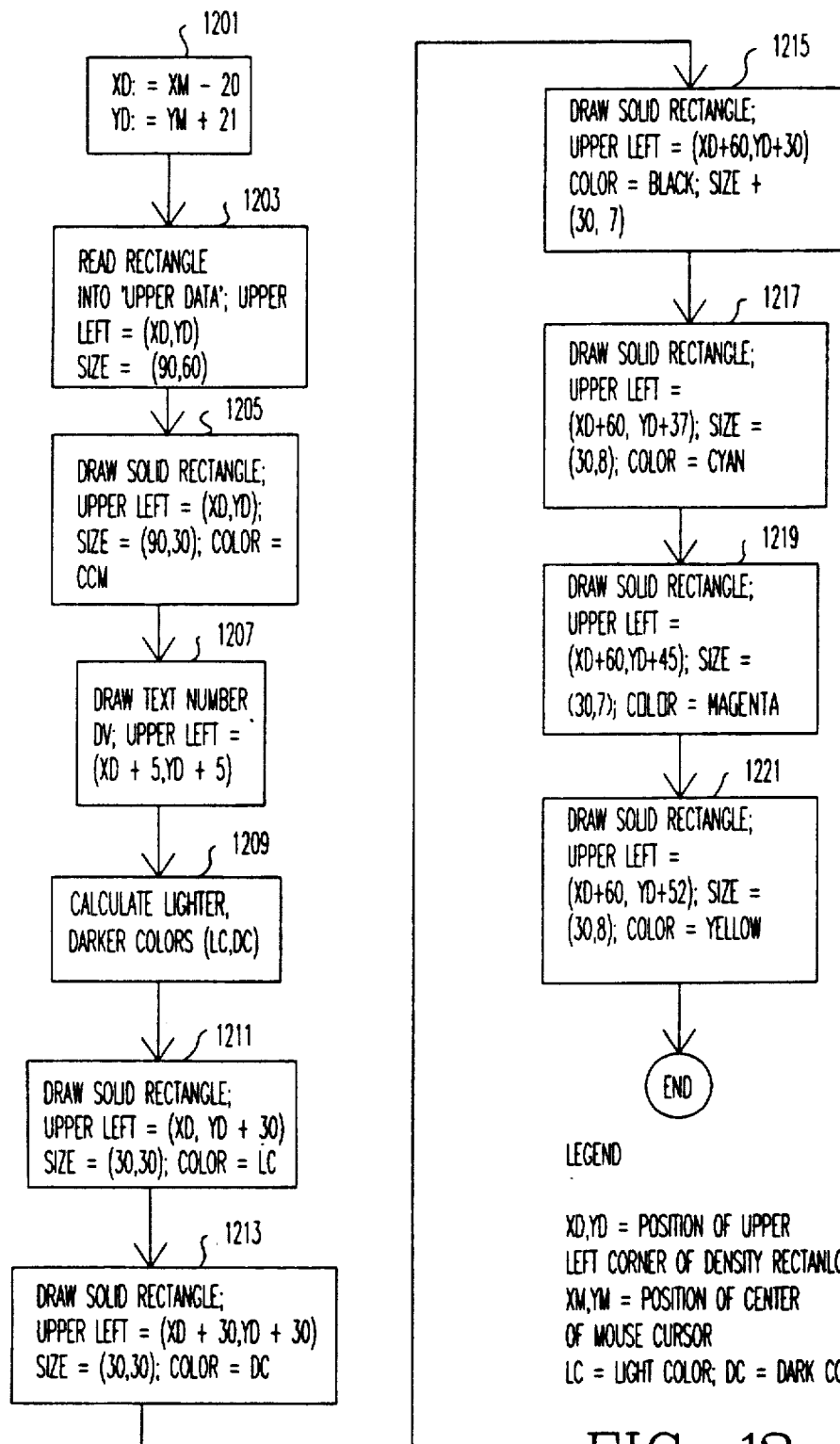
FIG. 12 illustrates the steps in drawing the rectangular overlay.

FIG. 12 illustrates processing which takes place in the cursor/display generator to draw the density rectangle. The variables xd and yd represent the position of the upper left corner of the density rectangle. The variables xm and ym represent the position of the center of the mouse cursor. As shown in block 1201, initially the position of the upper left corner of the density rectangle is set to the position of the center of the mouse $-20$ units in the x direction and $+21$ units in the y direction. The rectangle is then read into a "under data" portion of memory as noted from function block 1201, the upper left portion of the rectangle is set at the variables xd and yd and the size is set equal to 90 units in the x direction and 60 units in the y direction. Function block 1205 then shows a solid rectangle of a smaller size drawn with its color selected to be the current color mode. Function block 1207 shows the location of drawing text for the density value, while function block 1209 shows that the lighter and darker colors are calculated to be one increment above and one increment below the tone value displayed. Function blocks 1211 and 1213 show rectangles being drawn to display the lighter and darker colors. Function blocks 1215, 1217, 1219 and 1221 illustrate that solid rectangles are drawn on the lower right portion of the rectangle 11 to form area 6, as shown in FIG. 2. These display the black, cyan, magenta and yellow color stripes and complete processing of the cursor/display generation shown in FIG. 4.

Figure 13:
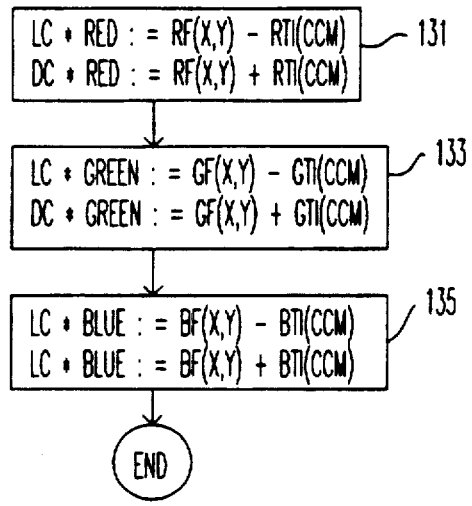
FIG. 13 illustrates the steps in calculating lighter and darker colors.

FIG. 13 illustrates the generation of the lighter and darker colors used in the display, as shown in reference numerals 4 and 5 of FIG. 2. As shown in function blocks 131, 133 and 135, the lighter increment of each color is calculated by subtracting the corresponding color tone increment from the appropriate plane of the frame buffer at the location specified by the cross-hairs. Thus, the lighter color for red is found by subtracting from the red plane of the frame buffer at the xy position specified by the cross-hair, the red tone increment for the current color mode. FIG. 13 also illustrates a truth table of the current color mode identifying each of the four possible current modes and the corresponding red, green and blue tone increments. It should be noted that for black the tone increments are equal, while for cyan, magenta and yellow all but the red, green and blue tone increments for the corresponding cyan, magenta and yellow color modes are 0. It is also notable that the blue tone increment for the yellow current color mode is twice the red and green tone increments for the cyan and magenta current color modes.

Figure 14:
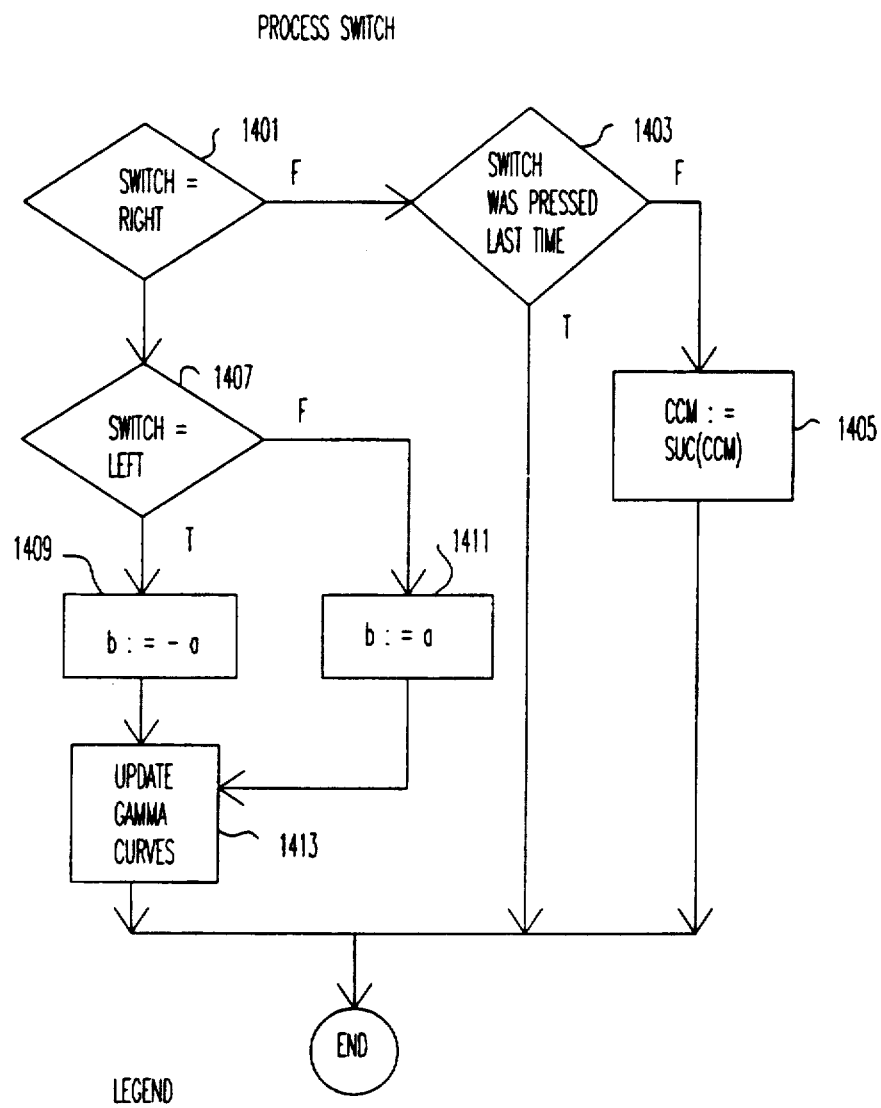
FIG. 14 shows the processing of the switch on the mouse.

FIG. 14 is a more detailed illustration of the switch processing. As previously described, mouse 17 has three switches, 14, 15 and 16. The right most switch, 16, is used to select the current color mode. If this switch was not pressed, function block 1401 transfers control to function block 1403 to determine if the switch was pressed during the previous time increment. If so, switch processing is complete. If not, the current color mode is adjusted to the next current color mode in the sequence, as shown in function block 1405, and illustrated in the truth tables shown in FIG. 14. If the switch on the right was not pressed, the left switch, 14, is then tested as shown in function block 1407 to determine if the lighter or darker increment has been selected. If switch 14 was selected, the direction of adjustment is negative, as shown in function block 1409. One of many possible circuit implementations to achieve this result was previously discussed in which switch 39 is set to the output of negating circuit 38. On the other hand, if switch 14 was not activated, the only remaining possibility is that switch 15 was activated and consequently, function block 1411 causes the adjustment to be in a positive direction. In the circuit implementation previously discussed, this corresponds to causing switch 39 to be set to the output of multiplier 37 without negating. As previously discussed, constant "a" determines the amount of density adjustment to the gamma curves. The variable "a" is typically 0.01 of the density value. A variable "b" which is set equal to "a" or "−a" defines the direction of the adjustment. Thus, in either case, as shown in function block 1413, the gamma curves are updated and processing is completed.

Figure 15:
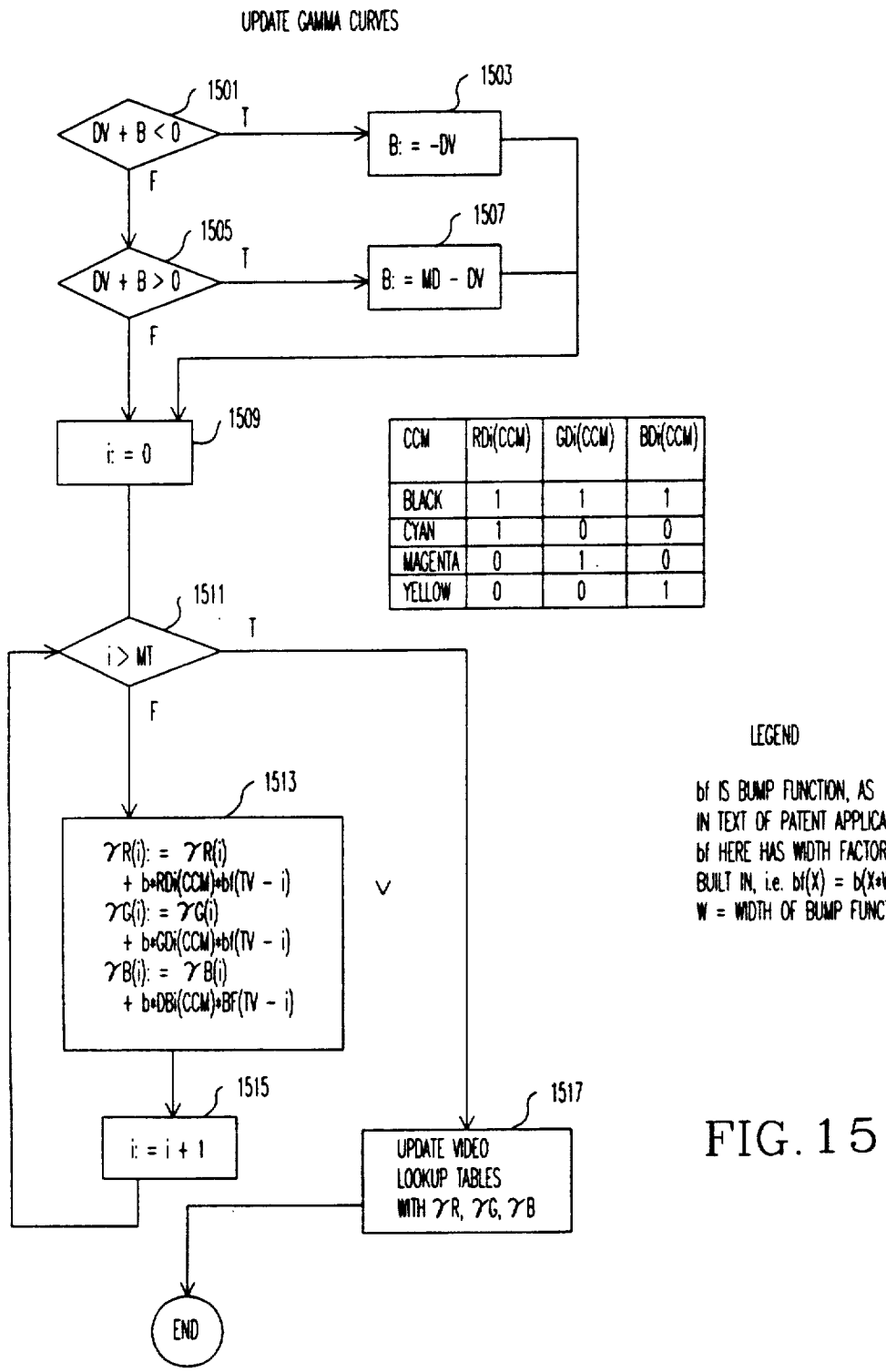
FIG. 15 shows processing to update the gamma correction curves.

FIG. 15 illustrates updating of the gamma correction curves. In function block 1501, if the density value plus the value of variable "b" is determined to be less than 0, the value of the variable "b" is set to be the negative of the density value, as shown in block 1503. On the other hand, if the density value plus the value of the variable "b" is not less than 0, block 1505 tests to determine if the density value plus the variable "b" is greater than the maximum density. If so, the variable "b" is set in function block 1507 to equal the maximum density minus the density value. In all cases, a variable "i" is then set equal to 0, as shown in function block 1509. Function blocks 1511, 1513, 1515 and 1517 show the sequence of updating the gamma correction curve. The variable "i" is incremented to cover the entire range of the gamma correction curve. For example, if there are 256 increments in the gamma correction curve, "i" which is initialized to 0 will be incremented as shown in function block 1515 until it reaches the maximum tone value at 255. If the maximum tone value has not been reached, the selected gamma curve is adjusted as shown in block 1513. Thus, the red gamma curve is updated at each point such that a new value at the point is determined to be the old value plus the product of variable "b," which is set equal to "a" or "−a," the red increment of the current color mode and the bump function of the address of the current point within the gamma curve minus the measured tone value. The same approach is used for updating the green and blue gamma correction curves. It should be noted that the truth table in FIG. 13 shows that the red, green and blue density increments for the current color mode are all set equal to 1 when the current color mode is black. When the current color mode is cyan, the red density increment is 1, while the green and blue density increments are 0. Similarly, when the current color mode is magenta, the green density increment is 1 and the red and blue density increments are 0, and when the current color mode is yellow, the red and green density increments are 0 and the blue density increment is 1.

The invention thus far has been described for use with color photographs assuming a red, green and blue color plane and corresponding gamma correction curves. Of course, the invention could be used to control a single gamma curve for use with monochrome photographs.

In addition, alternate arrangements of the mouse are possible. For example, the 3 switch mouse described could be replaced with a 1 button mouse or a computer keyboard. In addition, a mouse and a computer keyboard could be used together such that the mouse buttons select a lightening or darkening mode or switches on the keyboard select the mode to either lightening or darkening. Additional switches could also set the color plane to cyan, magenta, yellow or black.

The above-described invention requires no modification to the original image or writing onto the frame store. It is also possible to replace the frame store with live video and to use storage and retrieval of multiple gamma correction curves. Two passes could be made through a video program. In the first pass, gamma correction curves would be created for each scene in the video program and stored. In the second pass, the gamma correction curves could be retrieved and applied to each scene. Automatic detection of the scene changes could be used to automatically cycle through the stored gamma correction curves.

While specific embodiments of the invention have been described and illustrated, it will be clear that variations in the details of the embodiments specifically illustrated and described may be made without departing from the true spirit and scope of the invention as defined in the appended claims.

What is claimed is:

1. A method of reproducing a photographic original comprising the steps of:
   a) storing a representation of the original as a plurality of points in a storage means, each point representing a measured tone value in a color density plane;
   b) retrieving at least some of the points from the storage means for displaying on a video display at least a portion of the original;

c) applying a stored gamma correction curve for at least one of a plurality of color density planes to each retrieved point to arrive at gamma adjusted measured tone values for each point and displaying on said video display the points as a gamma corrected image;

d) isolating an area smaller than and within said portion of the original, said area being substantially a point of a single color of the gamma corrected image and retrieving from the storage means the measured tone value of the isolated area in a selected color density plane;

e) adjusting the gamma correction curve of the selected color density plane to obtain a gamma correction curve of a greater and lesser color density in the selected color density plane at the measured tone value;

f) simultaneously displaying on said video display a color indication of a first tone, the first tone being one increment less in density in the selected color density plane than the measured tone value and an indication of a second tone, the second tone being one increment greater in density in the selected color density plane than the measured tone value; and g) said step of adjusting the gamma correction curve includes selecting one of the first and second tones to obtain a desired density in the selected color density plane at the measured tone value.

2. The method recited in claim 1 further comprising the step of selecting another color density plane at said isolated area and repeating steps f and g.

3. The method recited in claim 1 wherein the step of isolating an area comprises locating crosshairs of a cursor over a selected point on a display.

4. The method recited in claim 1 wherein the step of displaying the indicator further comprises displaying a numerical value of the gamma adjusted measured tone value on the display means.

5. The method recited in claim 4 wherein the gamma adjusted tone value is an optical display.

6. The method recited in claim 1 wherein the step of displaying the indicator further comprises displaying the indicator in a window display located adjacent a cursor identifying the isolated area.

7. The method recited in claim 1 wherein the step of simultaneously displaying on said video display a color indication of said first and second tones comprise displaying a first area of a first solid color and a second area of a second solid color corresponding to said first and second tones, respectively.

8. A method of reproducing a photographic original comprising the steps of:

a) storing a representation of the original as a plurality of points in a storage means, each point representing a measured tone value in a color density plane;

b) retrieving at least some of the points from the storage means for displaying at least a portion of the original;

c) applying a stored gamma correction curve for at least one of a plurality of color density planes to each retrieved point to arrive at gamma adjusted measured tone values for each point and displaying the points as a gamma corrected image;

d) isolating an area of the gamma corrected image and retrieving from the storage means the measured tone value of the isolated area in a selected color density plane;

e) adjusting the gamma correction curve of the selected color density plane to obtain a gamma correction curve of a greater and lesser color density in the selected color density plane at the measured tone value; and f) said adjusting step further comprising the step of adjusting the gamma correction curve by adding a bump function to the density corresponding to the measured tone value, the bump function adjusting the color density for the measured tone value in the selected color density plane.

9. The method recited in claim 8 further comprising the step of displacing the bump function so that the center of the bump function coincides with the measured tone value.

10. The method recited in claim 8 comprising selecting adjustment of the gamma correction curve with the bump function to adjust the gamma correction curve in one of a positive and a negative direction.

11. The method recited in claim 10 wherein the bump function is determined for all possible tone values in the selected color density plane and the gamma correction curve is added to the bump function at all the possible tone values.

12. The method recited in claim 8 further comprising the step of setting a bump function width, said bump function width defining around the measured tone a local region of the gamma correction curve to be varied.

13. The method recited in claim 8 further comprising the step of storing the gamma correction curve adjusted by the bump function in a storage means.

14. An apparatus for reproducing a photographic original comprising:

a) storing means for storing a representation of the original as a plurality of points, each point representing a measured tone value;

b) means for retrieving at least some of the points from the storage means for displaying on a video display at least a portion of the original;

c) means for applying a stored gamma correction curve for at least one of a plurality of color density planes to each retrieved point to arrive at gamma adjusted measured tone values for each point and displaying on said video display the points as a gamma corrected image;

d) means for isolating an area smaller than and within said said portion of the original, said area being substantially a point of a single color of the gamma corrected image and for retrieving measured tone value of the isolated area in a selected color density plane;

e) means for adjusting the gamma correction curve of the selected color density plane to obtain a gamma correction curve of a greater and lesser color density in the selected color density plane at the measured tone value;

f) means for displaying on said video display a color indication of a first tone, the first tone being one increment less in density in the selected color density plane than the measured tone and an indication of a second tone, the second tone being one increment greater in density in the selected color density plane than the measured tone; and g) said means for adjusting the gamma correction curve includes selecting one of the first and second tones to obtain a desired density in the selected color density plane at the isolated area.

15. The apparatus recited in claim 14 further comprising means for selecting another color density plane at said isolated area and for repeating steps f and g.

16. An apparatus as recited in claim 14 comprising a memory means for storing a gamma density planes, each gamma correction curve having density values in a one to one correspondence with a plurality of tone values, the tone values corresponding to the measured tone values stored in the storage means.

17. The apparatus recited in claim 16 wherein the means for applying the gamma correction curves comprises means for retrieving from the memory means the density values corresponding to the measured tone values.

18. The apparatus recited in claim 17 further comprising at least one antilog circuit means having an input receiving the density values and an output connected to a display generating means.

19. The apparatus recited in claim 14 comprising means for generating crosshairs of a cursor and for locating the crosshairs over a selected point on a display, the selected point being the isolated area.

20. The apparatus recited in claim 14 further comprising means for displaying a numerical value of the gamma adjusted measured tone value on the display means.

21. The apparatus recited in claim 20 wherein the gamma adjusted tone value is an optical density.

22. The apparatus recited in claim 14 wherein the means for displaying the indicator further comprises means for displaying the indicator in a window display located adjacent a cursor identifying the isolated area.

23. The method recited in claim 14 wherein the means for simultaneously displaying on said video display a color indication of said first and second tones comprise means for displaying a first area of a first solid color and a second are of a second solid color corresponding to said first and second tones, respectively.

24. An apparatus for reproducing a photographic original comprising:
a) storage means for storing a representation of the original as a plurality of points, each point representing a measured tone value;
b) means for retrieving at least some of the points from the storage means and for displaying at least a portion of the original;
c) means for applying a stored gamma correction curve for at least one of a plurality of color density planes to each retrieved point to arrive at gamma adjusted measured tone values for each point and displaying the points as a gamma corrected image;
d) means for isolating the area of the gamma corrected image and for retrieving the measured tone value of the isolated area in a selected color density plane;
e) means for adjusting the gamma correction curve of the selected color density plane to obtain a gamma correction curve of a greater and lesser color density in the selected color density plane at the measured tone value; and
f) said adjusting means further comprising means for adjusting the gamma correction curve by adding a bump function to the color density corresponding to the measured tone value, the bump function adjusting the gamma correction curve for the measured tone value in the selected color density plane.

25. The apparatus recited in claim 24 further comprising means for displacing the bump function so that a center of the bump function coincides with the measured tone value.

26. The apparatus recited in claim 24 comprising means for selecting adjustment of the gamma correction curve with the bump function to provide positive adjustment and negative adjustment of the gamma correction curve.

27. The apparatus recited in claim 26 wherein the bump function is determined for all possible tone values in the selected color density plane and the gamma correction curve is added to the bump function at all the possible tone values.

28. The apparatus recited in claim 24 further comprising means for selecting a bump function width, the bump function width defining around the measured tone value a local region of the gamma correction curve to be varied.

29. The apparatus recited in claim 24 further comprising storage means for storing the gamma reduction curve adjusted by the bump function.

* * * * *